TRANSMISSION NETWORK

Filed July 31, 1959

INVENTOR
H. A. RHODES
BY F. R. McCorkendale
ATTORNEY

United States Patent Office 2,988,712

Patented June 13, 1961

2,988,712

TRANSMISSION NETWORK

Harold A. Rhodes, Bloomfield, N.J., assignor to American Telephone and Telegraph Company, New York, N.Y., a corporation of New York Filed July 31, 1959, Ser. No. 830,858
5 Claims. (Cl. 333—11)

This invention relates to a transmission network, and more particularly to a talkback bridge for use with four-wire telephone lines.

In modern telephone central office practice, in connection particularly with private line telephone, telegraph, or telephotograph channels, it is often desirable to so associate a plurality of four-wire circuits that each transmitting line, or leg, many transmit to all the receiving lines, or legs, except its own receiving leg. In order to prevent distortion, and for other obvious reasons, there should be, in ordinary instances, no transmission from any transmitting leg to its own receiving leg. An arrangement for this purpose in accordance with which four groups of four-wire circuits may be so interconnected is disclosed in United States Patent 2,035,536 issued March 31, 1936, to Messrs. F. A. Cowan and G. J. Goetz, while a similar arrangement for interconnecting six four-wire lines is disclosed in United States Patent 2,755,445 issued to me on July 17, 1956.

In certain special situations, for example if two four-wire stations such as a main station and an extension station, are bridged together at the same location, it becomes desirable that a "talkback" path be provided which will permit a certain amount of transmission between the transmitting leg and its associated receiving leg. This will allow the main station and the extension station to hear each other even though at reduced volume. In order that there be no impairment of the required high quality transmission over the system, it is essential that no unbalance of the system results from provision of the talkback circuit, thus to avoid echo effects, and that the return loss value be relatively high.

It is an object of the present invention, therefore, to improve the operation of four-wire telephone systems.

A more specific object of the invention is to provide a talkback path between a transmitting leg and its associated receiving leg without the introduction of unbalance effects in the system.

In accordance with a particular feature of the invention the talkback path involves an inductive coupling between the transmitting and receiving legs, thereby eliminating the undesirable effects resulting from an actual physical connection such, for example, as resistance arms connecting the two legs.

In accordance with a further feature of the invention means are provided whereby the talkback path can be adjusted to attain the particular return loss values desired.

A full understanding of the arrangement contemplated by the present invention, as well as appreciation of the various advantageous features, may be gained from consideration of the following detailed description in connection with the accompanying drawings in which.

Figure 1:
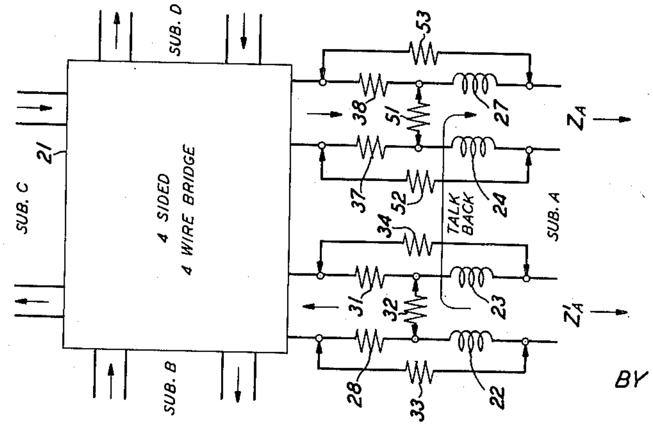
FIG. 1 illustrates schematically the interconnection of four four-wire circuits, one of which is provided with a talkback path of the nature contemplated by the present invention.

Referring now to FIG. 1 there are represented schematically four four-wire lines of subscribers A to D, respectively. As indicated by the directional arrows, each line includes a two-wire transmitting leg and a two-wire receiving leg. The lines are interconnected by a foursided, four-wire bridge 21 which will be assumed to be of the type disclosed in the F. A. Cowan et al. Patent 2,035,536 referred to above. This type of bridge provides relatively low loss resistance paths between the transmitting leg of each line and the receiving legs of each of the other lines. However, the loss between each transmitting leg and the receiving leg of the same line is so high that, for all intents and purposes, it can be said there is no connection between the transmitting leg and the receiving leg of the same line. Also, there is no effective path between the respective transmitting legs.

From the above it will be apparent that if two or more four-wire stations are bridged together at the same location, these stations will be unable to hear each other. This follows from the fact that in such arrangements the additional transmitter circuit would be connected to the common transmitting leg of the line and the additional receiver circuit would be connected to the common receiving leg, and since, as pointed out above, there is, in effect, no connection between the transmitting leg and the receiving leg of the same line. Also, it will be apparent that, even with a sigle station, no sidetone path is provided for the talker, a situation which under some circumstances may be undesirable; if sidetone is entirely absent from a substation circuit, subscribers when using the circuit may experience an annoying sensation of talking into a "dead" or "open" line, and, in order to combat this, it is often considered desirable to allow for a small, controlled amount of sidetone.

In order to correct this situation a talkback path of the nature contemplated by the present invention is provided at the station of subscriber A as illustrated in FIG. 1. The bridge for providing this talkback path includes a repeat coil the primary windings 22 and 23 of which are inductively coupled to the secondary windings 24 and 27, respectively.

The portion of the talkback bridge connected in the transmitting leg of subscriber A's line includes, in addition to windings 22 and 23, resistors 28 and 31, which are connected in series with the respective two sides of the transmitting leg, resistor 32 which is connected across the two sides of the line between the respective series windings and resistors, and resistors 33 and 34 which are connected in parallel with the respective two sides of the transmitting side of the bridge. It will be noted that resistors 32, 33, and 34 are readily replaceable in order to adjust the characteristics of the coupling bridge as will be described in detail subsequently.

Similarly, the portion of the talkback bridge connected in the receiving side of subscriber A's line includes, in addition to windings 24 and 27 of the repeat coil, resistors 37 and 38, connected in series with the respective two lines of the receiving leg, resistor 51 connected across the two lines, and resistors 52 and 53 which are connected in parallel with the respective two sides of the receiving side of the bridge. Resistors 51, 52, and 53 like resistors 32, 33, and 34, are readily replaceable for adjustment of the bridge characteristics.

Resistors 32, 33, and 34 will ordinarily comprise a set or group, as will resistors 51, 52, and 53, and each group may readily be removed as a unit and replaced by a group similar in configuration but of different resistance values. The same desired result may be attained, if desired, by utilizing adjustable resistors instead of the removable groups.

In the embodiment illustrated it will be assumed that the impedance $Z_A$ is 600 ohms with zero phase angle and that resistors 28, 31, 37, and 38 are each 300 ohms. Resistors 32 and 51 are each assumed to be $$\frac{600\omega}{K-1}$$

and resistors 33, 34, 52, and 53 are each assumed to be $300\omega(K-1)$, where K is a constant.

Through use of the novel circuit illustrated, and by selection of the components with proper characteristics, an exact balance of the overall circuit can be maintained and echoes, which would result from feedback to the main circuit as well as to the branch, are substantially eliminated. Also, the transmission loss in the talkback path from the transmitting leg to the receiving leg is independent of the impedances of the four-wire bridge. The manner in which the level of the talkback transmission is adjusted will be described subsequently. Preparatory to this further description reference will be made to FIG. 2 and FIG. 3.

Figure 2:
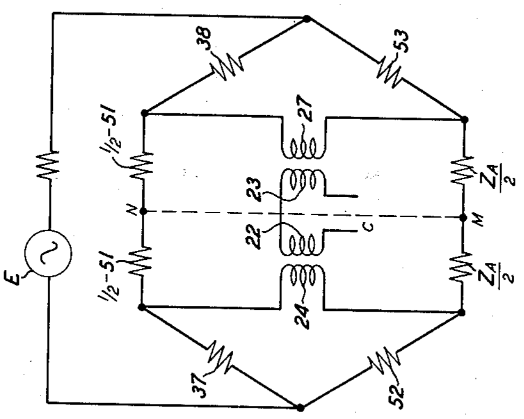
FIG. 2 illustrates schematically an equivalent circuit of one-half (electrically) of the talkback bridge.

Referring first to FIG. 2 there is shown an equivalent circuit of one-half of the talkback bridge of FIG. 1, i.e., the half of the bridge connected in the receiving leg. Where the exact components of FIG. 1 are represented, the same reference characters have been used as in FIG. 1. Point N represents the midpoint of shunt resistor 51 of FIG. 1 so that each of the two resistors shown connected at point N in FIG. 2 represents one-half of resistor 51 or $$\frac{300\omega}{K-1}$$

Similarly, point M represents the midpoint of the $600\omega$ circuit $Z_A$ connected to the "out" end of the receiving leg so that each of the resistors shown connected at point M in FIG. 2 represents $$\frac{Z_A}{2}$$

or $300\omega$. E represents the input from bridge 21. Now, if the equipotential points N and M are connected together as represented by the dotted line, there will be no current flow in the connection. It follows therefore that the circuit may be further simplified as in FIG. 3, the equivalent of FIG. 2.

Figure 3:
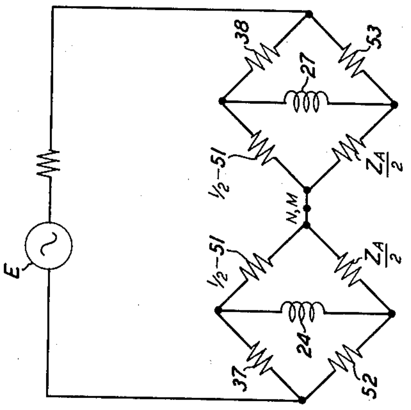
FIG. 3 illustrates schematically an equivalent circuit of FIG. 2.

In FIG. 3, referring to the left half of the bridge, since the impedance $Z_A$ is $600\omega$ at zero angle, and with the resistance values referred to above, we have the bridge equation:

$$\frac{300}{\dfrac{300}{K-1}}=\frac{300(K-1)}{300}$$

and no current will flow in coil 24. In the same way it is shown that there will be no current flow in coil 27, from which it follows that for the particular component values illustrated there will be no interchange of energy between the primary windings and secondary windings of the repeat coil in the feedback path. Now the desired amount of energy interchange in the repeat coil, as determined by the desired operating level of the talkback path, can be readily and exactly obtained by proper selection of the resistors 32, 33, and 34, and 51, 52, and 53. The value of K is determined by the resistors, the relationship being:

$$\text{Resistor group (db)}=20 \log K. \quad K>1$$

As mentioned above resistors 32, 33, and 34, and resistors 51, 52, and 53 comprise respective groups or sets, and other sets will commonly be made available with different characteristics. The level of the talkback path may be set at the desired value by the selection and use of the proper sets of resistors. As also mentioned above the same result may be attained by the use of adjustable resistors if preferred.

It will be understood, of course, that the two halves of the talkback circuit are symmetrical, and that in FIGS. 2 and 3 the selection of the right-hand section of the circuit instead of the left-hand section was purely arbitrary for purposes of description.

While a specific embodiment of the invention has been given by way of detailed description, the invention is not limited in its application to such embodiment. Other embodiments will be evident to those skilled in the art.

What is claimed is:

1. A four-wire communications line comprising a two-wire transmitting leg and a two-wire receiving leg, means for blocking transmission between said transmitting and receiving legs, and means for providing transmission at reduced volume between said legs, said last-mentioned means including inductive means for coupling said transmitting and receiving legs, and adjustable resistive means for regulating the balance between said transmitting and receiving legs.

2. A four-wire communications line comprising a two-wire transmitting leg and a two-wire receiving leg, means for blocking transmission between said transmitting and receiving legs, and means for providing transmission at reduced volume between said legs, said last-mentioned means including a repeat coil for inductively coupling said transmitting and receiving legs and a plurality of resistors for regulating the balance between said transmitting and receiving legs, certain of said resistors being capable of variation thereby to change the degree of said balance.

3. In combination, a plurality of pairs of lines, each pair consisting of a two-wire transmitting leg and a two-wire receiving leg, means interconnecting said lines to enable each transmitting leg to transmit effectively to all of the receiving legs of the others of said pairs, means for preventing effective transmission between the respective transmitting legs and between the transmitting leg and the receiving leg of the same pair, and an adjustable loss path for inductively coupling the transmitting leg and the receiving leg of one of said pairs of lines, thereby to provide transmission at desired levels between said transmitting leg and said receiving leg of said one of said pair of lines.

4. In combination, a plurality of pairs of lines, each pair consisting of a two-wire transmitting leg and a two-wire receiving leg, means interconnecting said lines to enable each transmitting leg to transmit effectively to all of the receiving legs of the others of said pairs, means for preventing effective transmission between the respective transmitting legs and between the transmitting leg and the receiving leg of the same pair, and means for providing transmission at reduced volume between the transmitting leg and the receiving leg of one of said pairs, said last-mentioned means including inductive means for coupling said last-mentioned transmitting and receiving legs and resistive means for regulating the balance therebetween, said resistive means being capable of variation thereby to change the degree of said balance.

5. In combination, a plurality of pairs of lines, each pair consisting of a two-wire transmitting leg and a two-wire receiving leg, a resistance bridge for interconnecting said lines to enable each transmitting leg to transmit effectively to all of the receiving legs of the others of said pairs and for preventing effective transmission between the respective transmitting legs and between the transmitting leg and the receiving leg of the same pair, and means for providing transmission at reduced volume between the transmitting leg and the receiving leg of one of said pairs, said last-mentioned means including inductive means for coupling said last-mentioned transmitting and receiving legs and adjustable resistive means for regulating the balance therebetween, the transmission loss from the last-mentioned transmitting leg to the associated receiving leg being independent of the impedance of said resistance bridge.

References Cited in the file of this patent

UNITED STATES PATENTS

| | | |
|---|---|---|
| 2,035,536 | Cowan | Mar. 31, 1936 |
| 2,039,202 | Vos | Apr. 28, 1936 |
| 2,395,540 | Edwards | Feb. 26, 1946 |
| 2,755,445 | Rhodes | July 17, 1956 |